Figure 1:
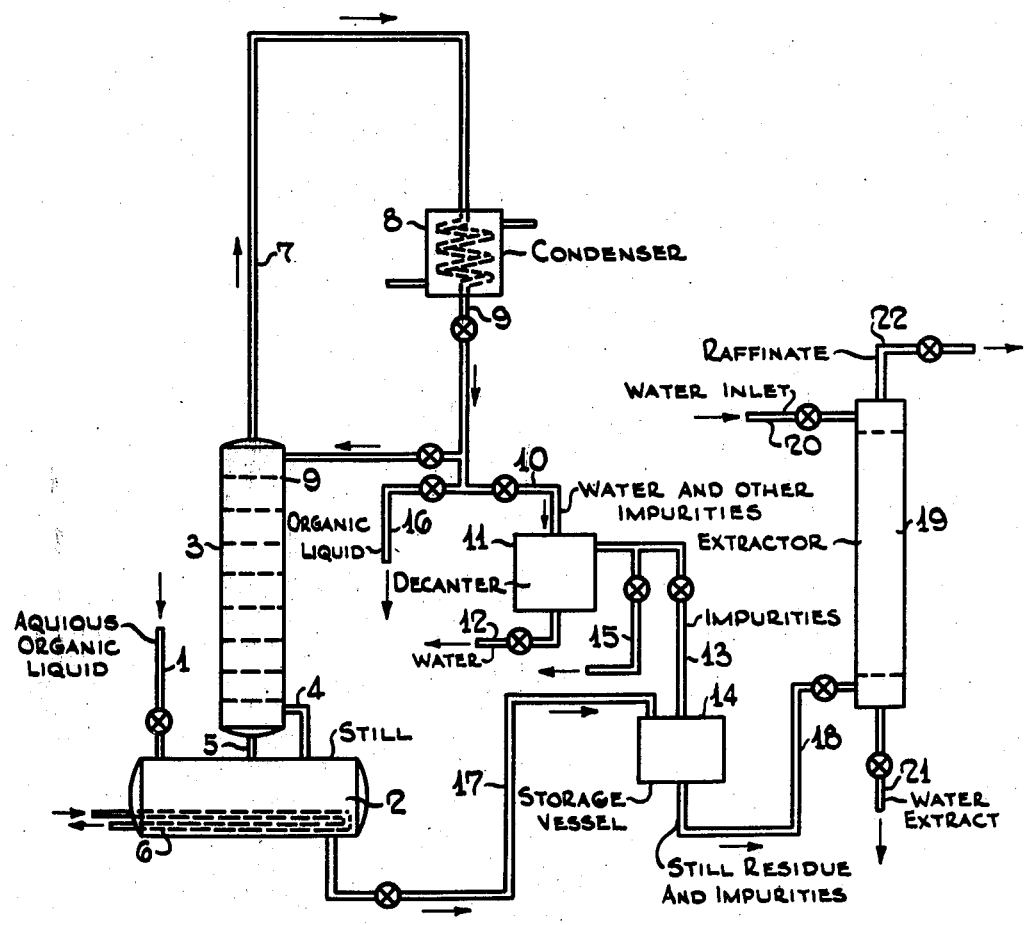

Patented May 17, 1949

2,470,222

UNITED STATES PATENT OFFICE 2,470,222

DISTILLATION OF ALCOHOLS CONTAINING IMPURITIES LESS SOLUBLE IN WATER

John A. Patterson, Westfield, N. J., assignor, by mesne assignments, to Standard Oil Development Company, a corporation of Delaware Application August 10, 1944, Serial No. 548,922

10 Claims. (Cl. 202—42)

This invention relates to the purification of organic liquids. The invention relates specially to the removal during distillation of impurities from the monohydric alcohols containing up to about five carbon atoms in the molecule. This application is a continuation in part of application Serial No. 423,318, filed December 18, 1941 (now abandoned).

In the purification of commercial organic liquids such as the alcohols produced by the treatment of olefins with sulfuric acid, the removal of impurities from the crude supply must be effected in a relatively simple and inexpensive manner. The establishing of such suitable refining procedure is beset with many difficulties, especially when the impurities are of a nature unsuitable as commercial by-products. The impurities which normally occur in such organic liquids can be divided into two classes: (1) the low boiling, relatively water-insoluble materials consisting mainly of ethers and hydrocarbons; and (2) high boiling, relatively water-insoluble impurties, usually of the nature of complex oxygen- and sulfur-containing compounds. The problem is also presented of removing the low boiling and high boiling impurities when an entrainer is employed in an azeotropic dehydration process for for the organic liquid.

Distillation is generally the easiest and cheapest means of extracting an organic liquid from a crude supply. When the organic liquid forms a constant boiling mixture with water, the low boiling impurities and water in the crude stock are easily removed first as constituents of azeotropes which form two phases upon condensation. From the residual material a considerable portion of the organic liquid may ordinarily be obtained in a high degree of purity. It is, however, generally impossible to remove all of the organic liquid from the residue in a high degree of purity. As the high boiling impurities are concentrated in the residue, the boiling point of the mixture increases to a point to which appreciable quantities of such impurities are distilled over with the product. In addition, it frequently happens that as the temperature increases the impurities which contain higher unsaturated compounds such as the alcohols and ketones decompose, giving products which impart to the organic liquid undesirable colors and odors.

When the distillation of the organic liquid is conducted in the presence of an excess of water, as is generally the case in the purification of the lower alcohols, the tendency of the higher boiling impurities to decompose is reduced but the tendency to carry the high boiling impurities overhead with the pure organic liquid is increased as a result of the steam distillation involved. In such cases, it is necessary to withdraw the impurities either as residue or as a side stream with a high content of the product organic liquid.

In the prior art, the high boiling impurities obtained in the purification of many organic liquids have been removed from distillation systems in considerable dilution. The removal of the impurities from such solutions has usually been effected by solvent extraction, that is, employing a liquid which dissolves either the undesirable impurities or the desirable organic liquid so that diphase systems are formed. In this manner, a relative separation of the impurities has been effected. For most commercial organic liquids the solvent employed in such cases is water since in the case of lower alcohols the organic liquid is soluble while the impurities are relatively insoluble. The extraction of the concentrated solution of the impurities with water is usually difficult and frequently unsatisfactory because of the very small differences in density between the two phases and also because of the tendencies to form emulsified solutions.

It has been found that by adding a concentrated solution of the low boiling impurities to the concentrated solution of the high boiling impurities a separation of the high boiling impurities can be advantageously effected by solvent extraction. It has also been found that the high boiling impurities may also be similarly removed from a concentrated solution of the high boiling impurities when large quantities of water are associated with the organic liquid after the removal of the low boiling impurities.

When the low boiling impurities are removed as constituents of azeotropes in the first stage of the distillation, the relatively non-aqueous phase which normally forms upon condensation has been added to the concentrated solution of the high boiling impurities. When the combined solution is treated with a solvent for either the organic liquid or the impurities in which the other is relatively insoluble, a means is thereby obtained for separating the impurities from the organic liquid. In the case of the lower monohydric alcohols, a selective solvent commonly employed in such cases is water.

In extracting with water the mixture of the non-aqueous phase formed from the low boiling impurities and the concentrated solution of the high boiling impurities, the efficiency of the separation of the impurities from the organic liquid appears due primarily to the marked difference in gravity between the two phases and to the avoidance of emulsification difficulties. Similar advantages can also be gained when either or both of the impure streams are mixed with small quantities of extraneous liquids to bring about either the desired gravity differential or the elimination of emulsion difficulties. A satisfactory and inexpensive process has thus been devised for the removal of easily decomposable impurities obtained in the purification of many organic liquids. This process has been found particularly advantageous in the treatment of residues obtained in the purification by azeotropic dehydration of the lower monohydric alcohols and the methyl ketones containing up to six carbon atoms in the molecule: these two types of compounds have similar physical characteristics, especially solubility in water.

Figure 2:
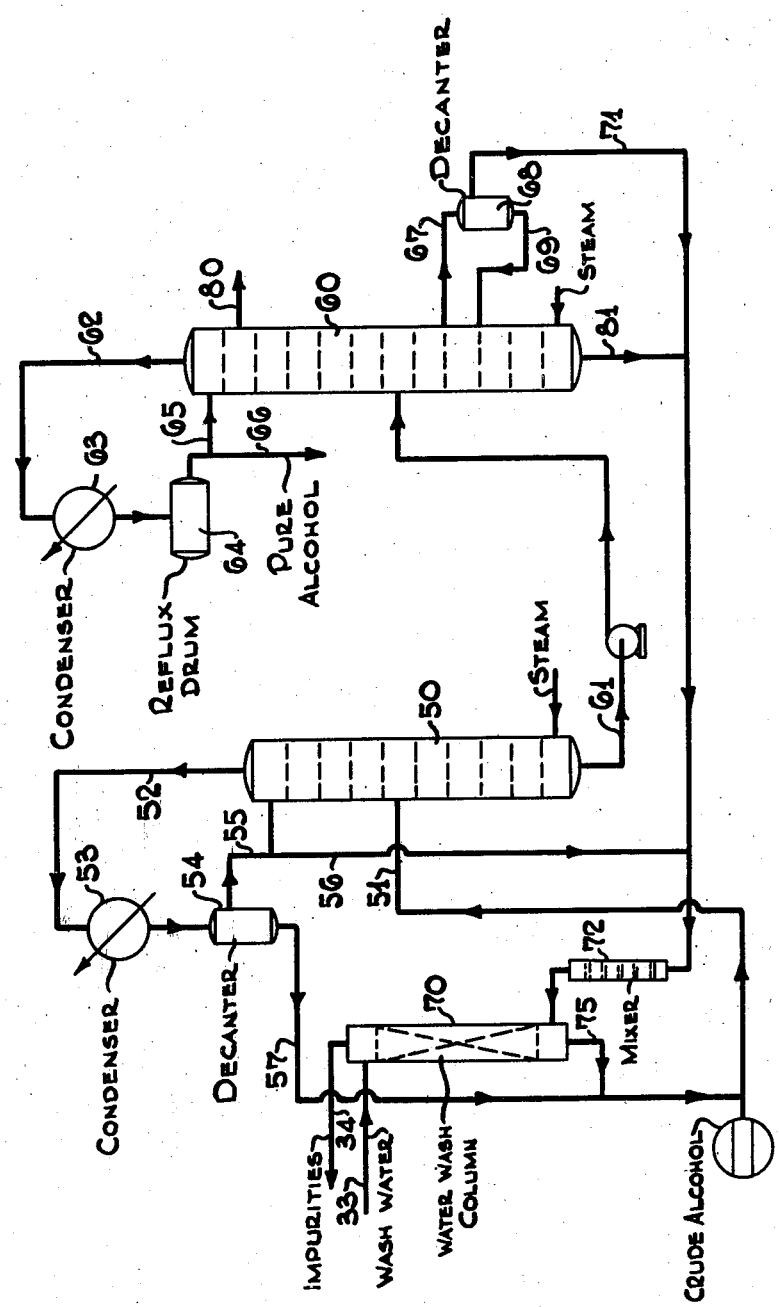

Processing according to the invention can be further understood by reading the following description in which the numerals refer to Figures 1 and 2. In Figure 1, processing is outlined as can be advantageously effected in batch scale operation, while in Figure 2 processing is outlined as can be conveniently carried out upon a continuous basis.

Thus, as shown in Figure 1, the crude supply is charged through line 1 into still 2 which is connected to distillation column 3 by means of vapor line 4 and reflux line 5. Heat is supplied to the still 2 by means of the closed steam coil 6. Distillate material from the distillation column 3 is removed through line 7 to condenser 8. Reflux from the condenser 8 is passed to the distillation column 3 through line 9. The initial distillate is withdrawn through line 10 to the decanter 11 in which time is allowed for the separation of phases. The relatively aqueous phase so formed is then passed through line 12 to process equipment not shown for recovery of its alcohol content. The relatively non-aqueous phase is passed through line 13 in controlled amounts to the storage vessel 14 and the excess passed through line 15. When the initial distillate material has been taken the main distillate of highly purified organic liquid is withdrawn through line 16, leaving a distillation residue which is removed from still 2 through line 17 to the storage vessel 14. Thus, in the vessel 14 the non-aqueous phase of the initial distillate in controlled amounts is mixed with the distillation residue. The mixture from vessel 14 is then passed through line 18 to the countercurrent extractor 19. Water is supplied to the extractor 19 through line 20. The water extract is withdrawn from the extractor through line 21 while the raffinate is withdrawn through line 22.

In Figure 2, a preferred embodiment of carrying out the process of the invention upon the continuous scale is outlined. In this method of processing the minimum equipment involves the use of two distillation columns, mixing equipment and a water-wash column interconnected with the necessary auxiliary piping equipment.

Thus, into a distillation column 50 the crude supply, as, for example, isopropyl alcohol containing between about 30 and 50% water, is introduced through line 51. The column 50 is supplied with open steam as the source of heat admitted through the base. The column is operated so that when all the low boiling impurities in the crude supply are removed as distillate material, some alcohol and some water usually as constituents of azeotropes are also removed. The impurities removed in this manner through line 52 are low boiling hydrocarbons, aldehydes, ketones and ethers. The overhead material is passed through condenser 53 and thence to decanter 54.

Due to the insolubility in water of some of the low boiling compounds, the condensate usually separates in the decanter 54 into two liquid phases, especially when ternary azeotropic mixtures are present. The pases thus formed are usually separated so that the upper phase may be partly returned as reflux to the tower 50 through line 55 and the remainder removed through line 56 to the mixer 72 for combination with the high boiling impurities obtained from the treatment of the distillation residue. The relatively aqueous phase is removed through line 57 and added to the crude alcohol supply. When the condensate in the decanter 54 does not separate into two phases due to emulsified condition or the presence of substantial quantities of water-soluble material, the entire distillate is usually divided into a reflux stream and a stream for passage to the mixer 72 for combination with the high boiling materials.

The distillation residue from column 50, consisting of alcohol free of the low boiling impurities and diluted with water, is passed through line 61 to the column 60. The column 60 is shown as being heated by means of a steam connection in the lower part of the column. The column is also equipped with an overhead vapor line 62, condenser 63, a reflux drum 64, a reflux line 65 and a product line 66. In some cases there may be a product side stream drawoff line 80, in which event the overhead connections consist of a vapor line connected to a condenser and reflux line 65 only to the column. When the column 60 is heated by means of open steam injected into the lower part of the column, additional equipment includes a side stream line 67, a decanter 68, a return line 69 and a bottoms withdrawal line 81. When closed steam, however, is employed as the heating means for the tower, this latter series of auxiliary equipment for withdrawing the side stream is obviated.

When the overhead product consists of alcohol free from the high boiling impurities, the stream is conducted to a condenser 63 and, after condensation, passed to the reflux drum 64. From the reflux drum 64 a portion of the condensate is supplied as reflux to the column 60 while the remainder is removed as product through line 66 and passed to storage. When open steam is employed as the heating means, the distillation residue from the bottom of column 60 consists largely of water and is removed from the system through line 81. When closed steam is employed, the distillation residue removed through line 81 consists essentially of the high boiling impurities in an anhydrous condition.

The high boiling impurities separated from the alcohol when open steam is used in the column 60 are not removed, on account of volatility, in the overhead stream nor in the distillation residue stream. The volatility of these high boiling compounds is lower than that of the alcohol and they are thus retained in the column, but, being insoluble in the aqueous residue, are steam distilled and accumulate in the tower some distance below the upper series of plates. At the point in the tower at which the relative concentration of the high boiling impurities is at a maximum, separation can be made of a side stream as through line 67. Such material is then passed to the decanter 68. Any water separating from the high boiling impurities in the decanter 68 is allowed to settle and is recycled to the column through line 69 at a plate below that upon which the side stream product was removed by means of line 67. The non-aqueous layer in the decanter 69 is removed through line 71 and passed to the mixer 72 to which, as previously described, are also passed the low boiling impurities from the column 50 through line 56.

The mixture of high and low boiling impurities after mixing in mixer 72 is introduced into the wash tower 70 where it is countercurrently contacted with water. The water dissolves the alcohol as a dilute solution which is passed through line 75 to the crude alcohol supply line. The water-insoluble stream contains the impurities from both of the streams supplied to the mixer 72 and only traces of the alcohol and water. When closed steam is used in the column 60, the high boiling impurities are separated as the distillation residue from the column 60 through line 81. This stream is then passed to equipment 72 where it is mixed with the low boiling impurities and then, as previously, subsequently treated with water in the tower 70.

A specific illustration of the invention is presented in regard to batch scale treatment in the following comparison of data. These data were obtained in the treatment of the distillation residue obtained in the purification of secondary butyl alcohol alone and when mixed with the upper phase material obtained from the distillate material in the azeotropic dehydration of secondary butyl alcohol. The distillation residue resulting from the purification of secondary butyl alcohol contained in this case 64% of secondary butyl alcohol and 36% of high boiling impurities. When this material was extracted with 3 volumes of water in a countercurrent extractor, and when similar volumes of a mixture of equal volumes of the residue and the upper phase of the distillate material were extracted with 3 volumes of water in the same countercurrent extracting equipment, the following comparative data were obtained:

|  | Residue Only | Mixed Residue and Upper Phase |
|---|---|---|
| Percent Alcohol in Feed | 63.5 | 42.4 |
| Extract: |  |  |
| Specific Gravity | 0.95 | 0.97 |
| Percent Alcohol | 16.8 | 12.0 |
| Percent Water Insol | 0.4 | 0.5 |
| Percent Water | 82.8 | 87.5 |
| Raffinate: |  |  |
| Specific Gravity | 0.73 | 0.72 |
| Percent Alcohol | 7.0 | 1.0 |
| Percent Water Insol | 92.9 | 98.9 |
| Percent Water | 0.1 | 0.1 |
| Percent of Alcohol Recovered in Extract | 95.7 | 99.1 |

It is to be noted that a higher concentration of alcohol is obtained in the extract from the extraction of the residue alone. By suitable adjustment of the water to feed ratio in the extraction of the mixture, as high an alcohol concentration in the extract could be obtained in the latter case without greatly increasing the alcohol content of the raffinate. The only gain in such a case, however, is in the amount of extract which must be handled to recover the alcohol, since in either case essentially the same quantity of alcohol is involved. Similar data may be obtained in the purification of methyl ethyl ketone as prepared by the dehydration of secondary butyl alcohol.

In the purification treatment on the plant scale of ethyl and isopropyl alcohols, it has been found that processing according to the invention on the continuous scale has produced substantially improved yields of the respective alcohols. Thus, in the treatment of isopropyl alcohol on plant operation, the following data have been obtained:

|  | Alcohol Concentrating Column Vol. Per Cent High Boiling Impurities on Respective Plates | | | |
|---|---|---|---|---|
|  | 7th Plate | 11th Plate | 14th Plate | 24th Plate |
| Previous Operations | 1.5 | 3.0 | 14.0 | 0.5 |
| Side Stream Withdrawal From 14th Plate Commenced: |  |  |  |  |
| After One Day |  |  | 8.5 | Trace |
| After Two Days |  |  | 4.5 | Trace |
| After Three Days | Trace | Trace | Trace | None |

As a result of such processing, the yield of isopropyl alcohol was increased by 16.6% for once through operation over that previously obtained. With ethyl alcohol the yield was increased by 17.7% by means of a similar operational improvement.

The method of the invention is applicable to the purification of a variety of commercial organic liquids. The principal feature of the invention is in regard to the obtaining of higher yields of the liquid undergoing purification due to the facility of separation of otherwise difficultly separable impurities. This separation may be caused, as illustrated in the previous description of the invention, by the mixing of two impure streams obtained during the course of the purification treatment or, as previously discussed, by the mixing of merely the impure stream with an extraneous liquid to obtain the separation between the impurities and the desired liquid. The method of the invention is particularly applicable, however, to the lower monohydric alcohols, ketones and organic liquids of similar physical characteristics, especially solubility in water.

What is claimed is:

1. An improved process for the purification of a crude alcohol containing from one to six carbon atoms in the molecule prepared from olefins by hydrolysis, which comprises distilling the crude alcohol, separating a light distillate fraction containing any light boiling impurities and water in said crude alcohol, a heavier fraction containing a major amount of the alcohol undergoing purification and a high boiling fraction containing the alcohol undergoing purification and any high boiling impurities, combining said fraction containing any high boiling impurities into solution with a portion of said fraction containing any low boiling impurities and treating said solution with water to extract the alcohol.

2. A process according to claim 1 in which the extraction of said solution is effected countercurrently.

3. A process according to claim 1 in which the portion of the low boiling distillate fraction combined with the fraction containing any high boiling impurities is decanted as a non-aqueous phase from water present in said fraction containing low boiling impurities.

4. A process according to claim 1 in which an aqueous alcoholic extract obtained by extraction from said solution is admixed with crude alcohol being distilled.

5. A process according to claim 1 in which the alcohol is ethyl alcohol.

6. A process according to claim 1 in which the alcohol is isopropyl alcohol.

7. A process according to claim 1 in which the alcohol is secondary butyl alcohol.

8. An improved process for the purification of secondary butyl alcohol prepared by the treatment of normal butylenes with sulfuric acid which comprises heating the crude supply to remove as initial distillate a mixture comprising water and low boiling relatively water-insoluble compounds, then the main distillate of relatively pure secondary butyl alcohol, leaving a distillation residue consisting essentially of high boiling compounds and secondary butyl alcohol, allowing the initial distillate material to separate into phases, adding the relatively non-aqueous phase to the distillation residue, extracting the mixture so obtained with water, adding the aqueous solution thus obtained to the relatively aqueous phase separation obtained from the initial distillate material and recovering from this mixture the secondary butyl alcohol.

9. An improved process for purifying an oxygen-containing organic compound having substantial solubility in water, said compound being in a crude aqueous liquid mixture contaminated by organic impurities having less solubility in water, which comprises distilling from said mixture a low boiling distillate of said compound with water and impurities in a distillation zone, combining a water immiscible organic liquid into a solution with said impurities of the distillate, extracting the compound to be purified from said solution with water, returning the resulting water extract from said solution to said distillation zone, and withdrawing from said distillation zone a fraction of the compound to be purified.

10. An improved process for purifying an oxygen-containing organic compound having substantial solubility in water, said compound being in a crude aqueous liquid mixture contaminated by organic impurities having less solubility in water with both lower and higher volatility than said compound to be purified in said liquid mixture, which comprises distilling from said crude liquid mixture a low boiling distillate of the compound with water and of the compound with impurities of high volatility, and a high boiling distillate of said compound to be purified, and leaving a residual fraction of said crude liquid mixture containing a portion of the compound to be purified with impurities of lower volatility and low water solubility, combining impurities of said residual fraction into a solution with a water immiscible liquid solvent, extracting remaining organic compound to be purified from said solution with water and adding the resulting water extract to the crude mixture being distilled.

JOHN A. PATTERSON.

REFERENCES CITED

The following references are of record in the file of this patent:

UNITED STATES PATENTS

| Number | Name | Date |
|---|---|---|
| 1,389,852 | Barbet | Sept. 6, 1921 |
| 2,017,067 | Kraft | Oct. 15, 1935 |
| 2,080,064 | Roelfsema | May 11, 1937 |
| 2,198,651 | Bludworth | Apr. 30, 1940 |
| 2,238,016 | Downey | Apr. 8, 1941 |
| 2,317,758 | Guinot | Apr. 27, 1943 |
| 2,324,755 | Beamer | July 20, 1943 |